United States Patent [19]

Sheppard

[11] 3,848,693

[45] Nov. 19, 1974

[54] DUAL HYDRAULIC POWER STEERING SYSTEM WITH HYDROSTATIC CONTROL

[76] Inventor: Richard H. Sheppard, c/o R. H. Sheppard Co., Inc., Hanover, Pa. 17331

[22] Filed: Nov. 1, 1973

[21] Appl. No.: 411,823

[52] U.S. Cl.................................. 180/79.2, 60/486
[51] Int. Cl............................................. B62d 5/06
[58] Field of Search.................. 180/79.2 R; 60/486

[56] References Cited
UNITED STATES PATENTS

| | | | |
|---|---|---|---|
| 3,602,326 | 8/1971 | Garrison | 180/79.2 R |
| 3,730,288 | 5/1973 | Dean | 180/79.2 R |

Primary Examiner—David Schonberg
Assistant Examiner—John A. Pekar
Attorney, Agent, or Firm—Lowe, King & Price

[57] ABSTRACT

The power steering for wheels is provided by two separate and independent steering combinations of first and second power operating units, corresponding first and second power supply means and control means, and the improvement of a hydraulic coupling means for the steering input derived from the steering shaft of the vehicle. The coupling means includes overdrive means effective to operate the second control means in slight anticipation of said first control means so that the second operating unit leads the first in driving the interconnecting steering linkage. Coordinating means is provided to limit the effectiveness of the coupling means in response to a predetermined pressure. The coupling means comprises a hydraulic circuit that includes a hydrostatic pump and motor, said motor serving to operate the control means for the second unit. The limiting of the pressure fluid to the motor in the circuit is accomplished preferably at 5 ft.-lbs. of torque applied to the steering shaft by oppositely directed check valves connected between the transfer lines in the circuit. The pump is approximately 10 percent larger in volume to provide the overdrive of the control means of the second unit. Interruption of power to one of the units allows continued operation in a safe manner with partial force power steering.

6 Claims, 4 Drawing Figures

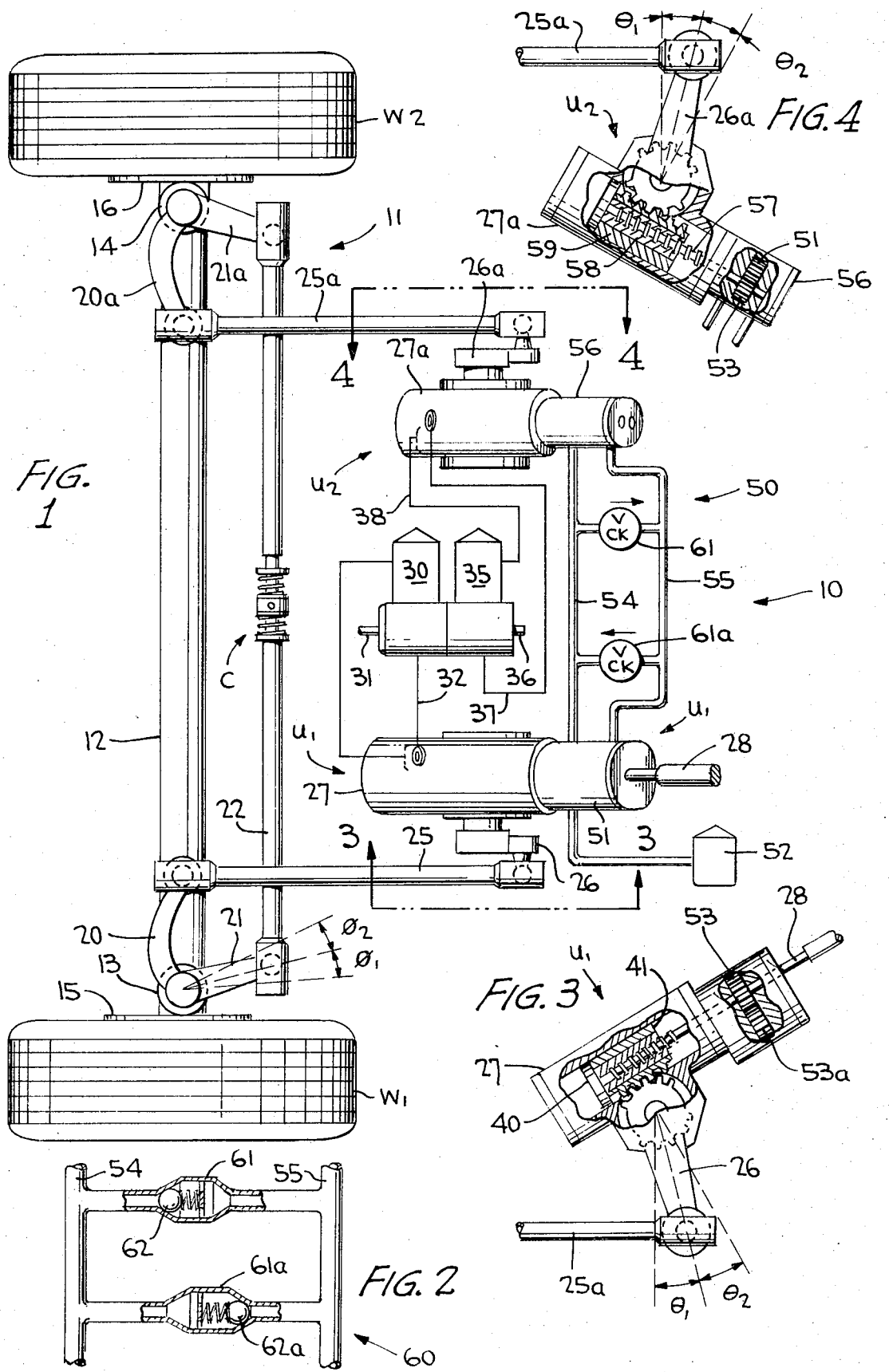

DUAL HYDRAULIC POWER STEERING SYSTEM WITH HYDROSTATIC CONTROL

The present invention relates to the power steering of vehicles, and more particularly, to a dual power steering system having independently operating combinations and with improved control of the interaction of said combinations.

BACKGROUND OF THE INVENTION

The recent development of dual power steering systems has brought new safety to the horizon for use in all vehicles, from automobiles to heavy trucks.

One problem that has faced the engineers in designing a dual power steering system is the difficulty of providing two power operating units that drive the interconnected steering linkage with sufficient amount of force to be safe, and with like "feel" in response to an input from the single steering shaft of the vehicle when one unit suffers failure. The problem lies mainly in the fact that two units, one associated with one wheel of the vehicle and the other unit associated with another wheel, will not operate the linkage and wheels with the same response to the input when failure occurs, thereby leading to a possible loss of control and an accident. In other words, for any one input signal from the steering shaft of the vehicle, one power operating unit by itself may give an effective "feel" to apply the required force to the linkage adjacent one wheel that is considerably different from the feel being applied when both units are operative. In order to correct this, a coordinating means is proposed to coordinate the operation of the two power steering combinations in a novel manner.

In my previous patent application, Ser. No. 236,410, filed Mar. 20, 1972, and entitled, "Dual Hydraulic Power Steering System," I disclose and claim a dual system wherein direct mechanical connection is made between the two control means, i.e., the control valves within the operating pistons of the steering gears are directly connected by drive gears and connecting shafts, as shown in that application. In the specific embodiment of the system, a resilient connection is interposed in the tie rod of the steering linkage in order to compensate for variations in geometry. While this system works well, it was found desirable to approach the problem from a different direction, that is, employing a hydrostatic circuit to provide the coupling between the steering input shaft and the control means of the two units, and also to provide the required coordinating function. The desirability of providing a hydrostatic interconnection between the two combinations is evident since the flexible hydraulic transfer hoses can be routed in a tortuous path within the engine compartment as desired or necessary. Also, it has been found in certain circumstances desirable to have the second or slave operating unit of a size smaller and more compact than the main or master unit.

OBJECTIVES OF THE INVENTION

Accordingly, it is a main object of the present invention to provide a dual hydraulic power steering system wherein an improved coupling means with built-in coordinating means is provided.

Another object of the present invention is to provide a power steering system having dual power operating combinations with an input coupling between the control means thereof, said coupling comprising a hydraulic circuit.

It is still another object of the present invention to provide a dual total hydraulic power steering system wherein the system is made failsafe due to assured operation of one unit upon failure of the other by built-in coordinating means, with assured like "feel" to the steering.

It is still another object of the present invention to provide an improvement in a power steering system with dual operating units utilizing the concept of overdrive of a slave operating unit to lead the master operating unit.

Still another object of the present invention is to have a dual system of the type described wherein the slave unit is limited in the steering force that it can apply and thus may be smaller than the main unit.

BRIEF DESCRIPTION OF THE INVENTION

In brief, a dual power steering system is provided having a hydrostatic control circuit coupling the master and slave operating units of the system. Two-way pressure relief in the circuit allows coordination between the operation of the two units. The coordinating means works by limiting the control pressure in the circuit identified by a predetermined threshold value of input torque on the steering shaft. The circuit or coupling means is adapted to operate the second control means for the slave unit, so as to slightly lead the first control means for the master unit. This results in an important feature that the slave unit is fully utilized before the main gear comes into action, and the master unit is operative only in the event that the system requires more output. The master contributes only that amount needed to supplement the slave unit, thus not affecting the critical "feel" of the system.

The hydraulic control circuit comprises a hydrostatic pump mounted on the master unit, a hydrostatic motor mounted on the slave unit and power and return transfer lines between the two units. The transfer lines are preferably conventional hydraulic hoses that may be positioned in the engine compartment along a tortuous path as may be required. Between the two lines, a pair of oppositely directed pressure relief/check valves are provided to release the pressure in the supply line to the return line at any particular time should the pressure exceed a predetermined maximum. In accordance with the specific inventive concept, this pressure is that pressure that results in the control circuit upon the application of approximately 5 ft.-lbs. of torque to the steering shaft.

The overdrive feature that assures first, full utilization of the slave unit, is provided by supplying the hydrostatic pump with a 10 percent greater volume capacity than the like hydrostatic motor driving said second control means of the slave unit. During operation, the power steering is thus performed exclusively by the slave unit up to the predetermined point of resistance in the steering shaft, and then the main gear cuts in to make up the difference needed. For example, if the steering is being totally carried out with the application of up to 5 ft.-lbs. of torque, which is the normal torque required for comfortable steering under highway driving conditions, then the total steering is performed by the slave unit. The interconnecting linkage including the tie rod manually moves the piston of the master unit to the new position essentially before pressure fluid is effective in said master unit to actually assist in the steering operation. Once the maximum is exceeded, however, that is, when it requires more than 5 ft.-lbs. of torque to turn the coupled steering wheels, the coordinating means in the form of a check valve is opened, limiting further work of this unit, and thereby allowing the master unit to come into play through its own control means. If desired, any value for the threshold switching point, up to say, 10 ft.-lbs. of torque can be built into the system. As the value is increased, of course, the amount of time that the master gear is being used may be reduced. For larger trucks and off-the-road vehicles where adverse conditions of steering, such as in muddy or rocky terrain, the higher maximum threshold values are appropriate.

Still other objects of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

BRIEF DESCRIPTION OF THE DRAWINGS

FIG. 1 is an overall view of the dual hydraulic power steering system of the present invention showing the system partially in schematic form;

FIG. 2 is an enlarged view showing the pressure relief valves forming the coordinating means;

FIG. 3 is a detailed view of the master gear unit of the system taken along line 3—3 of FIG. 1; and FIG. 4 is a detailed view of the slave gear unit taken along line 4—4 of FIG. 1.

DETAILED DESCRIPTION OF THE PREFERRED EMBODIMENT

With reference now to FIG. 1 of the drawing, a power steering system with dual actuating combinations is shown, and the system is generally designated by the reference numeral 10. The linkage that is activated by the system is shown by the reference numeral 11, and for illustrative purposes, a front axle 12 having king pin support eyes 13, 14 at the ends thereof, is shown. Coordinated steering wheels, $W_1$, $W_2$ of the vehicle are supported for rotational movement on the ends of the axle 12 by typical spindle assemblies 15, 16. the dual power system 10 is well adapted for any type of wheel vehicle, including trucks and automobiles, as well as off-the-road equipment, with one or more axles used for steering. In addition, instead of steering just the wheels on a front axle, any combination of wheels, including the rear wheels, could be effected as long as the wheels are coordinated.

The steering linkage 11 comprises a steering arm 20 that is connected to the spindle assembly 15 adjacent the wheel $W_1$. A counter part steering arm 20a is provided on the opposite side of the vehicle adjacent the second wheel $W_2$. Fixed to the steering arms 20, 20a are crank arms 21, 21a that are, in turn, interconnected to a tie rod 22 which synchronizes the steering of the wheels $W_1$, $W_2$. Thus, when the crank arm 21 moves through an angle $\Phi_1$, as shown, the wheel $W_2$, is also turned through the same angle and the vehicle will be steered to the right. Similarly, steering to the left is generated by moving the crank arm 21, for example, through an angle $\Phi_2$, with the wheels $W_1$, $W_2$, moving through a corresponding angle to the left. A compensating means in the form of a spring and slide joint may be provided in the tie rod 22 so that errors in geometry and outside forces are accomodated.

The steering motion to the linkage 11 is imparted to the steering arms 20, 20a by drag links 25, 25a, respectively. The drag links are reciprocated, in turn, by cranks 26, 26a of first and second power operating units, generally designated by the reference indicia $U_1$, $U_2$, respectively. As best shown in FIGS. 1 and 3, the power operating units $U_1$, $U_2$ are or may be typical power steering gear assemblies with cylinders 27, 27a. Because the first power operating unit $U_1$ is controlled directly from steering shaft 28, and it may be larger and dominating under certain circumstances, it is considered to be the master steering gear unit. The other unit, $U_2$, is not directly driven, but is driven through hydraulic coupling means that will be described below, and is, accordingly, a slave unit.

While the steering gear assemblies are preferred for the operating units $U_1$, $U_2$, and this use is in accordance with certain more specific concepts of the present invention, in some installations power cylinders could be used in lieu of said assemblies. Also, certain other obvious modifications can be made within the broad aspects of the invention. Many of these are more fully explored in my above-mentioned application entitled "Dual Hydraulic Power Steering System," Ser. No. 236,410, filed Mar. 20, 1972, and need not be reiterated here.

The power steering gear assemblies are properly sized to fit the vehicle upon which are to be employed. Each unit $U_1$, $U_2$, when activated produces different amounts of the total maximum design output force required to comfortably steer the vehicle. Because the two units work from entirely separate components, there is partial power steering left when for any reason one combination fails, as will be seen later. Each combination of operating unit and the control and supply components are independent for directly turning the separate wheels $W_1$, $W_2$ through the steering arms 20, 20a so that the maximum total torque can be applied to the wheels. It will be remembered however that the separate forces are synchronized through the tie rod 22 so that the wheels turn together when either unit $U_1$, $U_2$, or both, is providing the driving force.

Present day standards for power steering require that the input torque to turn the steering shaft 28 (FIG. 1) of a typical vehicle should be maintained at approximately 3 to 5 ft.-lbs. of torque. In may previous design, the two power steering gear units were designed to work equally with each other to provide this output. The present invention differs from that previous design, and other designs of which I am aware, in that the slave unit $U_2$, having its own power supply, is always effective to provide the force to turn the wheels $W_1$, $W_2$, so long as only 5 ft.-lbs. of torque need to be applied by the driver. It is only in difficult driving conditions that the master unit $U_1$ comes into action, and, in effect, takes up the slack.

As shown in FIG. 1, the main or first operating unit $U_1$ is provided with a pump and reservoir 30 driven by an input shaft 31 and with hydraulic supply line 32 and return line 33. The slave or second unit $U_2$ is provided with its separate pump and reservoir 35 driven by the shaft 36 and with supply and return lines 37, 38. This set-up allows operation of one of the units $U_1$, $U_2$ when any one component in the other combination fails.

The master or main unit $U_1$ is shown in more detail in FIG. 3. As shown, the output crank 26 has a gear segment that is driven by output piston 40 when the unit is activated. This driving can result in movement of the crank 26 through an appropriate angle $\theta_1$, $\theta_2$ that corresponds to the angles $\Phi_1$, $\Phi_2$ of the arm 21 in FIG. 1.

A conventional valve 41 in the piston 40 provides the control means for the unit $U_1$, and thus, as is conventional, is responsive to the steering shaft 28 when turned. Specifically, the valve 41 is axially moved by threaded engagement with the shaft 28, thereby opening the ports of the valve to transfer fluid to the appropriate end of the piston 40 in the cylinder 27. This, in turn, moves the piston and through the gear engagement with the crank 26 provides the steering response necessary to turn the wheels of the vehicle. As is well known, in the event of failure of hydraulic fluid, the direct coupling steering is still mechanically effective through the threaded engagement of the shaft 28 with the valve 41, the supporting washer springs at the ends of the valve 41, the piston 40, and the crank 26.

In accordance with the present invention, a hydraulic circuit, generally designated by the reference numeral 50, is provided to coordinate the actuation of the two units $U_1$, $U_2$. Mounted piggyback on the main or master unit $U_1$ is a hydraulic gear pump 51 that is provided with a suitable supply of hydraulic fluid from a reservoir 52. The pump 51 is provided with suitable cooperating gears 53, 53a (see FIG. 3) with one gear being fixed to the input shaft 28. Depending on the direction of rotation, the pump 51 supplies pressure fluid to one of two outlet orifices and provides an exhaust to the other. Connected to these orifices are transfer lines 54, 55 that are connected at their opposite end to a hydraulic motor 56 (see FIG. 4). The structure of the motor 56 can be identical to the pump 51 except that the pump 51 has approximately 10 percent more volume capacity than the motor 56, for the reason that will be more fully described below. The motor 56 is also designed to be reversible and, as is clear, is driven in response to the pressure in either of the transfer lines 54, 55 as supplied by the pump 51. The motor 56 has a drive shaft 57 that is directly connected to control valve 58 in piston 59 by a threaded shaft like the valve 41 in the unit $U_1$. Thus, as the motor 56 rotates, the valve 58 is axially moved and power assisted output force is ultimately applied to the crank 26a to steer the vehicle.

As mentioned, the pump 51 is designed with a volume capacity of approximately 10 percent greater than the corresponding capacity of the motor 56. This means that as the steering shaft 28 is turned, the motor 56 turns approximately 10 percent faster than, or in anticipation of, the shaft 28, and thus, the valve 58 in the unit $U_2$ starts to open prior to the valve 41 in the unit $U_1$. As the valve 58 in the unit $U_2$ is opened, the force is immediately applied to the piston, and the linkage 11 effectively begins to operate to turn the wheels $W_1$, $W_2$. The piston 40 in the main unit $U_1$ is in the meantime being moved in the proper direction by operation of the valve 41 directly from shaft 28, but is lagging slightly behind so that the piston 27 has not actually performed any work to turn the wheels $W_1$, $W_2$ under these circumstances. With the slave unit $U_2$ being in slight anticipation of unit $U_1$, the unit $U_1$ is, in essence, not being brought into play, and no steering is being performed thereby.

It is to be understood that the approximately 10% overdrive of the motor 56 has been determined empirically as appropriate for a typical system with a minimum amount of slippage of fluid with respect to the pump 51 and the motor 56 in the control circuit 50. In determining the appropriate overdrive in a working embodiment, the value should be selected that allows the piston 59 of the unit $U_2$ to lead the piston 40 of the unit $U_1$ by a small enough margin that the two valves 58, 41 are both substantially returned to their neutral positions at any rotational position of the steering shaft 28 as the pistons 51, 59 are stabilized each time after a turning operation.

As will be evident, in the circuit 50 the pump 51 and the motor 56 are otherwise identical (except for their slight difference in volume capacity). The reservoir 52 is designed to maintain the circuit 50 full of fluid at all times so that there is substantially immediate hydrostatic response between the pump 51 and the motor 56 at all times. The compensating means C is effective to compensate for any temporary imbalance between the actions of the two units $U_1$, $U_2$ as the pistons 41, 59 are stabilized or due to errors in geometry or outside forces.

Coordination means 60 is provided in the hydraulic circuit 50. Primarily, this means is provided in order to limit the output of the unit $U_2$ and to prevent the unit $U_2$ from getting too far ahead of the unit $U_1$. Preferably, the coordination means takes the simple form of two oppositely directed pressure limiting check valves 61, 61a, best shown in FIG. 2. To explain, when the shaft 28 is rotated in one direction during steering, this may provide the high control pressure in line 54, the motor 56 is turned, and the unit $U_2$ is operated. If the wheels $W_1$, $W_2$ are hard to turn, the shaft 28 must be turned with greater torque, and consequently, the hydrostatic pressure in the line 54 is increased. At the moment the predetermined threshhold value is reached, the valve 60 opens due to the lifting of ball 62 from its seat, and further increase in pressure in the control circuit is prevented due to exhausting through the return line 55 back to the pump 51. Similarly, when the shaft 28 is rotated in the opposite direction for steering of the vehicle in the opposite direction as required and the predetermined threshhold value is reached, ball 62a is lifted from its seat and further pressurization of the motor 56 in this direction is prevented. At this point in either case, the piston 59 in the slave unit $U_2$ may be considered to be stalled momentarily, allowing the operation of the valve 41 in the master unit $U_1$ that is only slightly behind to catch up, and the master unit $U_1$ thereby is brought into action to supply exactly the extra power needed.

To explain in another way, when the initial limited turning of the steering shaft 28 is not operative to accomplish the steering necessary, the occupant of the vehicle immediately applies additional torque to the shaft 28. The slave unit $U_2$ is not effective to apply additional force, but the main unit $U_1$ is then available to provide the additional driving force needed. This additional driving force is, as stated above, due to the flow of fluid through the control valve 41 and into the appropriate end of the cylinder 27 to move the piston 40.

The pistons 40, 59 in the units $U_1$, $U_2$ are moved substantially in unison and the wheels are thus turned as required.

Preferably, the threshhold pressure for operation of the dual system of the present invention is that pressure generated by the pump 51 when the shaft 28 is turned with approximately 5 ft.-lbs. of torque. This is more than sufficient for normal driving operation and the linkage 11 will be turned exclusively by the slave unit $U_2$ under such conditions.

In accordance with the present invention, if any component of the first combination including the master unit $U_1$ fails, steering with no loss of power under "normal" driving conditions is maintained, since the control circuit 50 and the separate second combination including the slave unit $U_2$ remains fully operable. The "feel" is maintained the same since, as is remembered, the slave unit $U_2$ has been providing the driving force. On the other hand, if the second combination suffers a component failure, the valves 61, 61a of the coordinating means 60 allows immediate pressure relief in the control circuit 50 and the master unit $U_1$ is operative to supply the full steering requirement, again without any substantial change in "feel." The direct, mechanical coupling of the steering shaft 28 with the piston 41 in the unit $U_1$ is effective for supplemental force in those rare instances that might arise when more than 5 ft.-lbs. of torque are needed during an emergency situation when the power to the master unit $U_1$ is out.

In view of the foregoing, it can be seen that a dual power steering system has been provided that includes a novel hydraulic circuit 50 that assures proper operation and coordination between the master and slave operating units $U_1$, $U_2$. The pump 51 is directly connected to the input steering shaft 28 and is provided with 10 percent greater volume than the motor 56 and it operates so that the slave unit $U_2$ always slightly anticipates the master unit $U_1$. This means that the slave unit $U_2$ is effective under "normal" conditions to provide the driving force. When harder steering is encountered, due to increased outside force to one of the wheels $W_1$, $W_2$, the coordinating means 57 allows immediate pressure relief in the control circuit 50, the master unit $U_1$ provides the extra power needed, and the steering continues to be effected smoothly and without interruption. Upon failure of either combination, the other provides all of the force necessary to operate the vehicle and substantially without a change in the critical "feel" of the steering.

In this disclosure, there is shown and described only the preferred embodiment of the invention, but, as aforementioned, it is to be understood that the invention is capable of use in various other combinations and environment and is capable of changes or modifications within the scope of the inventive concept as expressed herein.

I claim:

1. In a dual hydraulic power steering system for coordinated turning wheels of a vehicle comprising first and second power operating units, steering linkage means provided between said wheels and said power operating units to interconnect the same, corresponding first and second power supply means interconnected to the corresponding operating units, first and second control means to direct the flow of fluid as required to steer the vehicle, means for coupling said control means, steering shaft means to operate said first control means and said coupling means, each combination of operating unit, control means and supply means being independent for directly turning separate wheels and each combination providing less than the total maximum design force required to allow the operator of the vehicle to comfortably turn said wheels, the improvement comprising in said coupling means, overdrive means effective to operate said second control means so as to lead said first control means in operation of said operating units, and coordinating means to limit the effectiveness of said coupling means in response to a predetermined torque applied to said steering shaft means, whereby both of said combinations may normally operate in said system but with leading by said second combination, and, upon failure of one combination, partial force power steering may still be effective.

2. The power steering system of claim 1 wherein said coupling means comprises a hydrostatic pump driven by said steering shaft means, said steering shaft also being directly coupled to said first control means, hydrostatic motor means coupled to said second control means to operate the same, two hydraulic transfer lines extending between said motor and said pump and two way check valve means between said transfer lines to form said coordinating means, whereby upon reaching a predetermined pressure in the pressure line of said coupling means, the corresponding check valve opens to limit the force of said second operating unit.

3. The power steering system of claim 2 wherein said two way check valve means comprises a pair of oppositely directed check valves connected between the transfer lines, said check valves being biased by individual springs so as to be designed to open upon reaching a predetermined hydraulic pressure to thereafter bypass said hydrostatic motor.

4. The power steering system of claim 3 wherein said check valves are operative to open to bypass said motor upon application of approximately 5 ft.-lbs. of torque to said steering shaft.

5. The power steering system of claim 2 wherein said hydrostatic pump is approximately 10 percent larger in volume than said hydrostatic motor so as to provide the overdrive means and the leading characteristic.

6. The power steering system of claim 1 wherein said first power operating unit comprises a power steering gear with direct manual drive connection from said steering shaft means to said steering linkage means, whereby upon failure of said first combination manual steering is available to supplement power steering through said second combination.

* * * * *